United States Patent [19]

Poncelet et al.

[11] Patent Number: 6,027,702
[45] Date of Patent: Feb. 22, 2000

[54] ALUMINUM-BASED POLYMER MATERIAL AND USE OF THIS MATERIAL IN A PHOTOGRAPHIC PRODUCT

[75] Inventors: Olivier J. Poncelet; Jeannine Rigola, both of Chalon Sur Saone, France

[73] Assignee: Eastman Kodak Company, Rochester, N.Y.

[21] Appl. No.: 08/864,488

[22] Filed: May 28, 1997

[30] Foreign Application Priority Data

Jul. 11, 1996 [FR] France .................................. 96 08900

[51] Int. Cl.[7] .................................................. C01B 33/26
[52] U.S. Cl. ...................... 423/118.1; 423/713; 423/69; 428/689; 428/537.7; 106/286.2
[58] Field of Search ................... 428/688, 689, 428/699, 701, 537.7; 106/286.2, 286.4, 286.5, 813; 423/69, 71, 326, 327.1, 328.1, 713, 716, 118.1

[56] References Cited

U.S. PATENT DOCUMENTS

| 3,644,220 | 2/1972 | Kearby .................................... 252/442 |
| 3,676,330 | 7/1972 | Plank et al. ............................. 208/111 |
| 4,119,464 | 10/1978 | Sauerteig et al. ........................... 96/68 |
| 4,764,632 | 8/1988 | Cohen ....................................... 556/27 |
| 4,837,396 | 6/1989 | Herbst et al. ............................. 502/67 |
| 5,292,799 | 3/1994 | Naito et al. ............................. 524/783 |
| 5,340,895 | 8/1994 | Panster et al. ............................. 77/26 |
| 5,432,007 | 7/1995 | Naito et al. ............................. 428/447 |

FOREIGN PATENT DOCUMENTS

| 0 204 327 | 12/1986 | European Pat. Off. . |
| 61-277967 | 12/1986 | Japan . |
| 62 148 946 | 7/1987 | Japan . |
| 72148946 | 7/1987 | Japan . |
| 96 13459 | 10/1995 | WIPO . |

OTHER PUBLICATIONS

Chemical Abstracts, vol. 124, No. 26, 1996.

*Primary Examiner*—Deborah Jones
*Assistant Examiner*—Stephen Stein
*Attorney, Agent, or Firm*—Carl F. Ruoff

[57] ABSTRACT

The invention concerns an inorganic aluminum-based polymer and another element chosen from amongst silicon, titanium and zirconium. The polymer material is obtained from hydrolisable salts and/or compounds such as alcoxides. Application to the production of ancillary layers in photographic products.

4 Claims, 6 Drawing Sheets

ALUMINUM-BASED POLYMER MATERIAL AND USE OF THIS MATERIAL IN A PHOTOGRAPHIC PRODUCT

FIELD OF THE INVENTION

The present invention concerns a novel polymer material based on aluminum and another element chosen from titanium, zirconium or tin, and the use of this material to produce layers able to be used for a photographic product.

BACKGROUND OF THE INVENTION

International patent application No PCT/EP95/04165, filed on Oct. 24, 1995 and entitled "Polymer silico-aluminate and method of preparing it" describes a material with a fibrous structure and anti-static properties.

SUMMARY OF THE INVENTION

The present invention has as its object a similar inorganic polymer material, but in which all or part of the silicon has been replaced by an element chosen from the class consisting of titanium, zirconium or tin. According to one embodiment, the said element has another element added to it. In the present description and in the claims which accompany it, the inorganic polymer material will be referred to as polymer alumino-metallate.

The present invention also has as its object a photographic layer, comprising the said polymer alumino-metallate. According to one embodiment, the layer contains the polymer material and a binder. Photographic layer refers to any layer of a photographic product, that is to say a photosensitive layer whatever the photosensitive substance, or a non-photosensitive ancillary layer, for example a supporting under-layer, an intermediate layer or a top layer.

The polymer material according to the invention comprises at least 50% and, preferably, 80% molar of a constituent of the formula:

$$Al_x M^1{}_{y1} Si y_2 O_z$$

in which x represents the Al stoichiometry of the composition and is in the range of from 0.8 to 3;

$M^1$ is chosen from the class consisting of tin, titanium and zirconium;

$y_1$ represents the stoichiometry of M1 in the composition;

$y_2$ represents the stoichiometry of Si in the composition and can be equal to 0 x, $y_1$ and $y_2$ are such that $x/y_1 + y_2$ is in the range of from 0.8 to 3;

z is determined by the valency of the various elements of the composition so as to obtain neutrality of charges.

The percentage of constituent $Al_x M^1 y_1 Si y_2 Oz$ in the polymer alumino-metallate can be evaluated by the X-ray spectrometry technique known as "Energy Dispersive X-ray spectrometry" or EDX, or by the emission spectrometry technique known as "Inductively Coupled Plasma" or ICP.

According to one embodiment, $M^1$ is associated with an additional element. This additional element is preferably an element present in the interstitial lattice of $M^1$, in a quantity representing between 0.1 and 7% molar with respect to $M^1$. This additional element can vary according to the nature of $M^1$ and the electrical and/or optical effects sought. If the conductive characteristics are to be maintained or improved, it is possible to use as an additional element, elements from the groups Vb and Va such as Nb, Ta, Sb or halogens. Thus examples of polymer alumino-metallates in accordance with the invention comprise inorganic aluminum-titanium, aluminum-zirconium, aluminum-tin, aluminum-titanium-silicon, aluminum-zirconium-silicon or aluminum-tin-silicon, with the optional addition of the elements in the groups Vb and Va referred to above.

Figure 1:
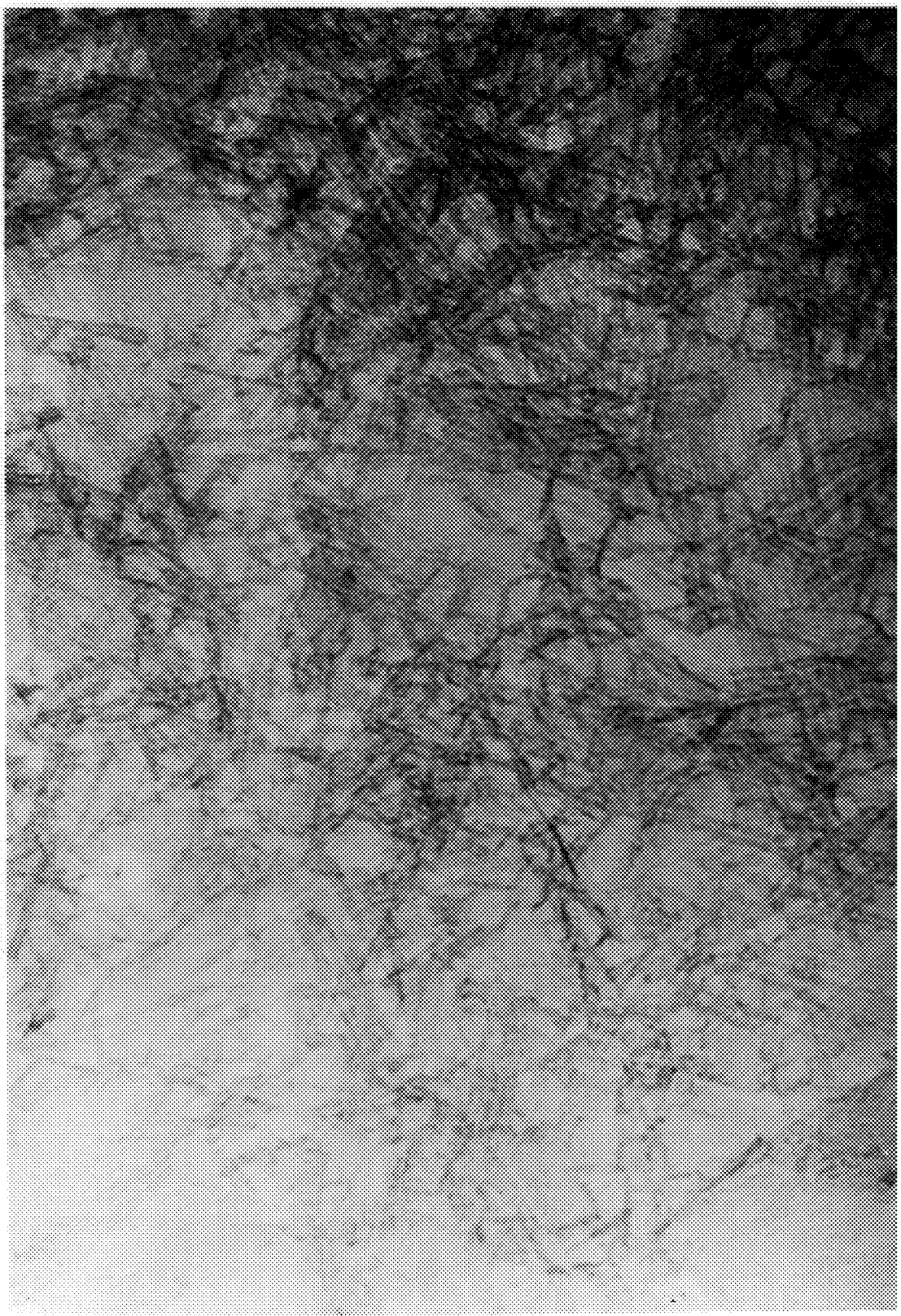
FIG. 1 shows a micrograph of the particles from Example 1.

For a better understanding of the present invention reference is made to the following detailed description in connection with the above-referenced drawings.

DETAILED DESCRIPTION OF THE PREFERRED EMBODIMENTS

The method of preparing the polymer alumino-metallate according to the invention is identical to the method described in the aforementioned International patent application No PCT/EP95/04165, with the exception of the starting products. Hydrolysable compounds of aluminum and of the chosen metal are used as starting products and the mixture is hydrolyzed at a controlled pH. The product obtained is then subjected to heating to a temperature below 100° C. in the presence of silanol groups, and then the product can be separated, for example by gelification, elimination of excess water, redissolving the gel with hydrochloric acid and purifying the solution by dialysis.

As starting products, use is made of salts or compounds able to be hydrolyzed at a pH between 3 and 4. An excessively acidic pH requires soda to be added to adjust the pH, and can lead to loss of anisotropy. Furthermore, the excessively acidic pH causes the precipitation of silica when an alumino-metallate is prepared which also comprises silicon. An excessively basic pH causes the formation of metal hydroxide.

Starting products with appropriate reactivity comprise for example aluminum compounds such as halides, such as chloride or bromide, perhalogenates, such as perchlorate, sulphate, nitrate, sulphate or carboxylates, alcoxides such as aluminum ethoxide or aluminum isopropoxide.

Starting products for the other metal $M^1$ are, for example, halides, halogen alcoxides, alcoxides, etc. One technique consists of slowly adding a pure alcoxide or an alcoxide in an alcohol solution of $M^1$ to an aqueous solution of aluminum halide or aluminum alcoxide. The heating stage is performed as described in the aforementioned international patent application.

The alumino-metallates obtained preferably have an anisotropic structure, that is to say that when examined by electron microscope techniques, they appear to consist of particles with a dimension at least equal to 1.5 times each of the other two dimensions of the particle. Advantageously, according to the observation of electron microscope photographs, the particles are elongate to the point that their largest dimension is equal to at least 20 times and preferably at least 100 times each of the other two dimensions. According to one embodiment, the particles can be elongate to the extent that they effectively take the form of filaments. This structure makes the alumino-metallates according to the invention suitable for forming layers, even thin ones, of the type encountered in photographic products (with a thickness between 0.5 and 10 μm); these layers, depending on the choice of the metal $M^1$ and optionally of the additional element, can be transparent and/or conductive. They also exhibit resistance to alkaline hydrolysis, which is important for a silver halide photographic product designed to be developed in an alkaline developer.

The alumino-metallates according to the invention can be used to prepare photographic layers, either as the sole constituent of such a layer, or in admixture with a binder. It is possible to use the conventional vehicles of photographic layers, that is to say proteinic binders such as gelatins, cellulosic binders such as hydroxy alkyl celluloses, or polyalkylene glycol vehicles.

The following examples illustrate the invention.

EXAMPLE 1

A solution of 0.48 g (3.6 mmoles) of aluminum chloride in 1500 ml of water purified by osmosis is introduced into a glass reactor. 0.44 g (2.1 mmoles) of $TiCl_2(OEt)_2$ is added. The solution is stirred vigorously and an opalescent mixture is obtained whose pH is 3.61. The pH is adjusted to 5 with NaOH 1N and then, after 5 minutes, to 4.35 with a mixture of HCL 1N and acetic acid 2N. The mixture is then heated to a temperature between 80 and 98° C. for 120 hours. It is left to cool. The pH of the mixture is 3.75. A solution of ammonia is added slowly to adjust the pH to 8. A gel is obtained which is centrifuged for 15 mins at 2000 rev/min. The gel is returned to solution form by adding a few drops of HCL 12N, and then the resulting solution is dialyzed with osmosed water.

120 g of a thixotropic gel is collected which comprises by mole 63% aluminum and 37% titanium, for an Al/Ti ratio by weight of 0.82 as determined by "ICP" emission spectrometry. Microscopic examination of this gel shows that it consists of elongate particles which are piles of assembled fibrils (FIG. 1).

EXAMPLE 2

Figure 2:
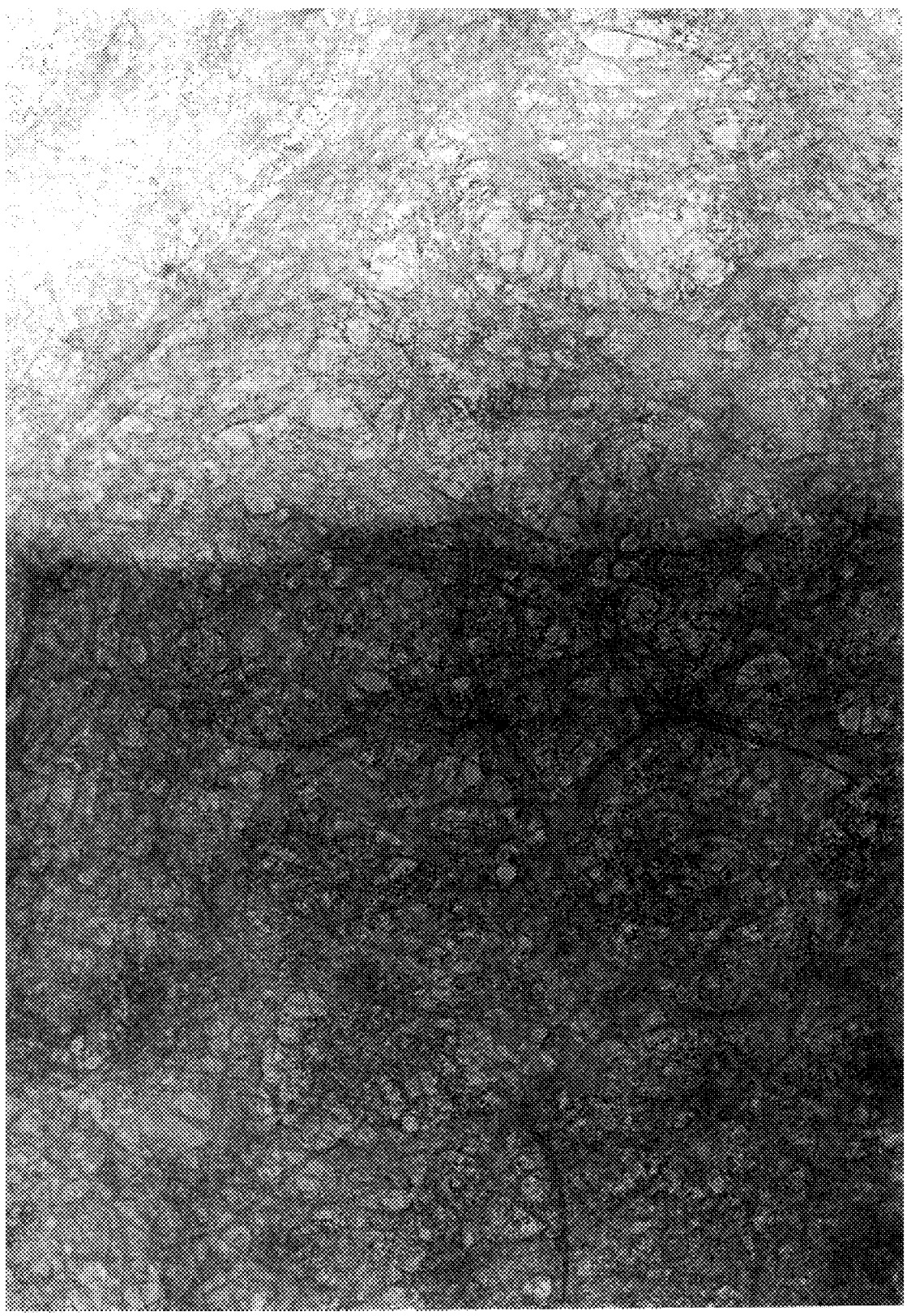
FIG. 2 shows a micrograph of the particles from Example 2.

Some aluminum chloride hexahydrate (0.87 g; 3.6 mmoles) is introduced into a glass reactor. While stirring, 0.29 g (1.4 mmoles) of tetraethoxysilane, followed by 0.29 g (1.4 mmoles) of $TiCl_2(OEt)_2$ are added drop by drop. After an hour, the pH stabilizes at 3.7. The pH is adjusted to 5 with NaOH 1N, and then after 5 minutes to 4.35 with a mixture of HCl 1N and acetic acid 2N. The reactor is then heated at a temperature between 80 and 98° C. for 120 hours. It is left to cool to room temperature. The pH of the mixture is 3.98. The pH is adjusted to 8 using a solution of ammonia; a gel is obtained which is centrifuged for 15 mins at 2000 rev/min. The gel is redissolved by adding a few drops of HCL 12N, and then the solution is dialyzed with osmosed water. 120 g of a thixotropic gel is obtained which has an Al:Tl+Si ratio by weight of 0.90, as determined by ICP. Microscopic examination shows that this gel consists of particles and filaments (FIG. 2).

EXAMPLE 3

Figure 3:
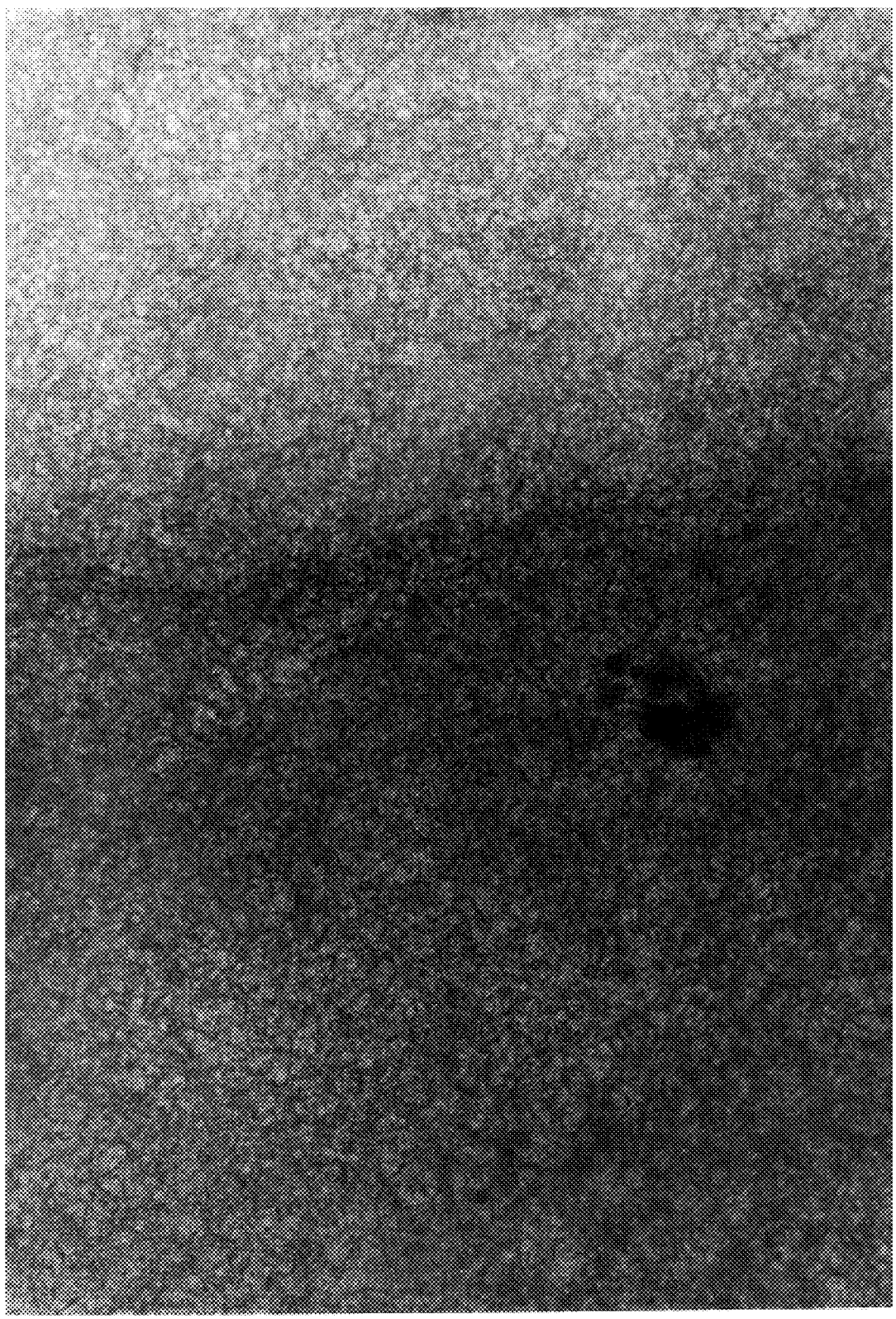
FIG. 3 shows a micrograph of the particles from Example 3.

0.49 g (2.1 mmoles) of zirconium chloride (IV) is introduced into a glass reactor. A solution of 0.73 g (3.6 mmoles) of aluminum isopropoxide in 1500 ml of osmosed water is then added drop by drop. The mixture is stirred vigorously for 24 hours and a transparent reactional medium is obtained which has a pH of 4.63. The pH is adjusted to 5 with NaOH 1M; the medium becomes cloudy, and then the pH is re-adjusted to 4.58 with a mixture of HCL N and acetic acid 2N. A transparent solution is obtained which is heated for 120 hours at a temperature between 80 and 98° C. It is then left to cool to room temperature. The pH of the medium is 3.94. The product is coagulated and purified as in Example 1. A thixotropic gel is obtained which has an Al:Zr ratio by weight of 0.50 as determined by ICP. Microscopic examination shows that this gel consists of fibers and particles (FIG. 3).

EXAMPLE 4

Figure 4:
FIG. 4 shows a micrograph of the particles from Example 4.

0.29 g (1.4 mmoles) of tetraethoxysilane is added drop by drop to a solution of $AlCl_3$ hexahydrate (0.87 g, 3.6 mmoles) in 1500 ml of osmosed water. A solution of 0.87 g (3.6 mmoles) of zirconium (IV) chloride is then added. The pH of the mixture, which is 3.43, is adjusted to 5 with NaOH 1N, and then after 5 minutes to 4.35 with a mixture of HCL 1N and acetic acid 2N. The mixture is then heated and purified as in Example 1. A thixotropic gel is obtained which has an Al:Zr+Si ratio by weight of 0.48 as determined by ICP. Examination by electron microscope (×125,000) reveals a fibrous structure (FIG. 4).

EXAMPLE 5

A solution of 2.7 g (7.2 mmoles) of aluminum nitrate monohydrate in 3000 ml of osmosed water is introduced into a glass reactor. 1.1 g (4.2 mmoles) of tin (IV) chloride and then 0.038 g (0.17 mmoles) of antimony (III) chloride are added drop by drop.

Figure 5:
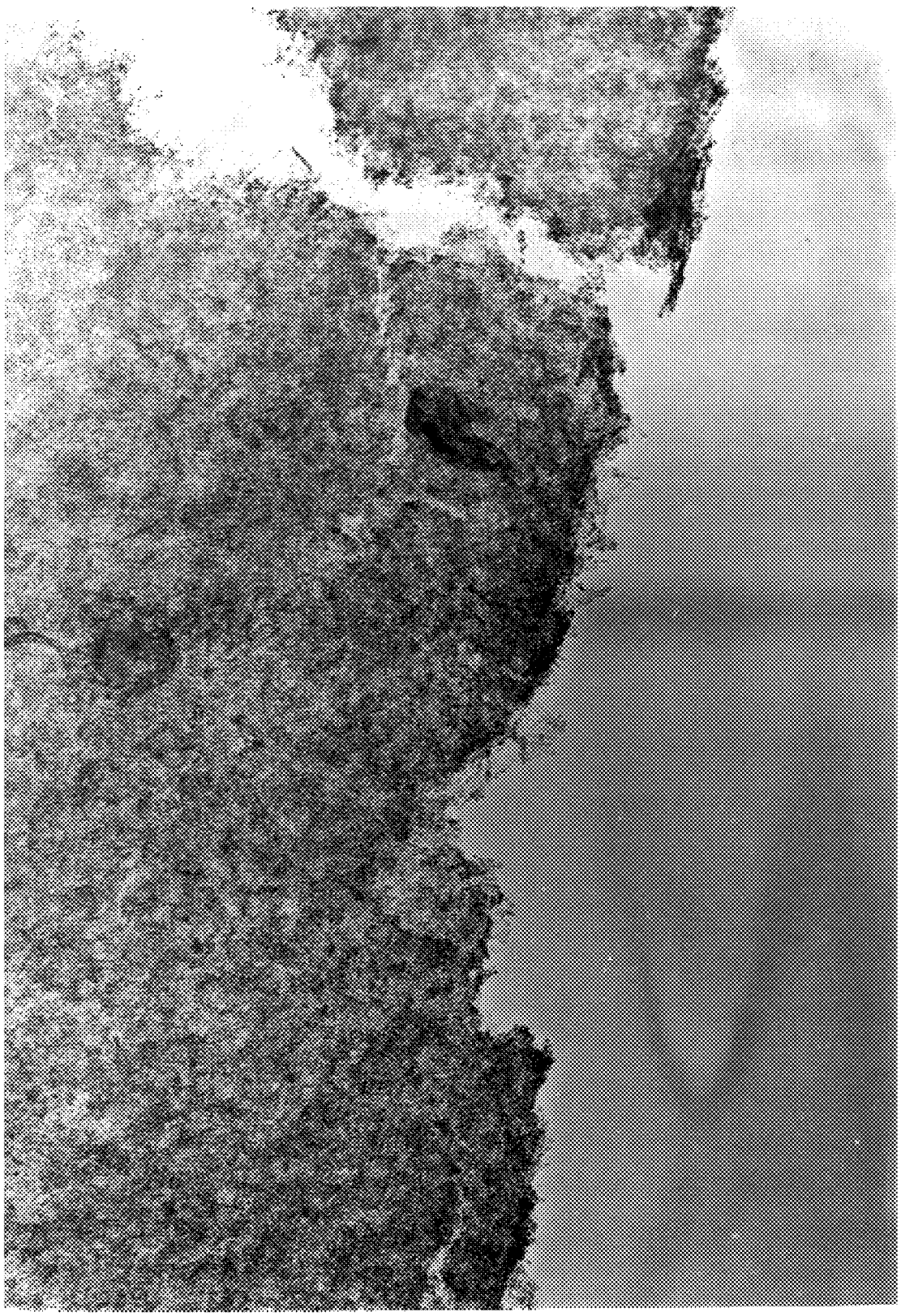
FIG. 5 shows a micrograph of the particles from Example 5.

The mixture is stirred vigorously for 24 hours. The reactional medium is yellow and slightly cloudy (pH 3.15). The pH is adjusted to 5 with NaOH 1N, and then after 5 minutes to 4.55 with a mixture of HCl 1N and acetic acid 2N. The solution is heated and the resulting gel coagulated and purified as in Example 1. A thixotropic gel is obtained which has an Al:Sn ratio by weight of 0.27 by EDX. FIG. 5 shows a microscopic view of the structure of the gel.

EXAMPLE 6

Figure 6:
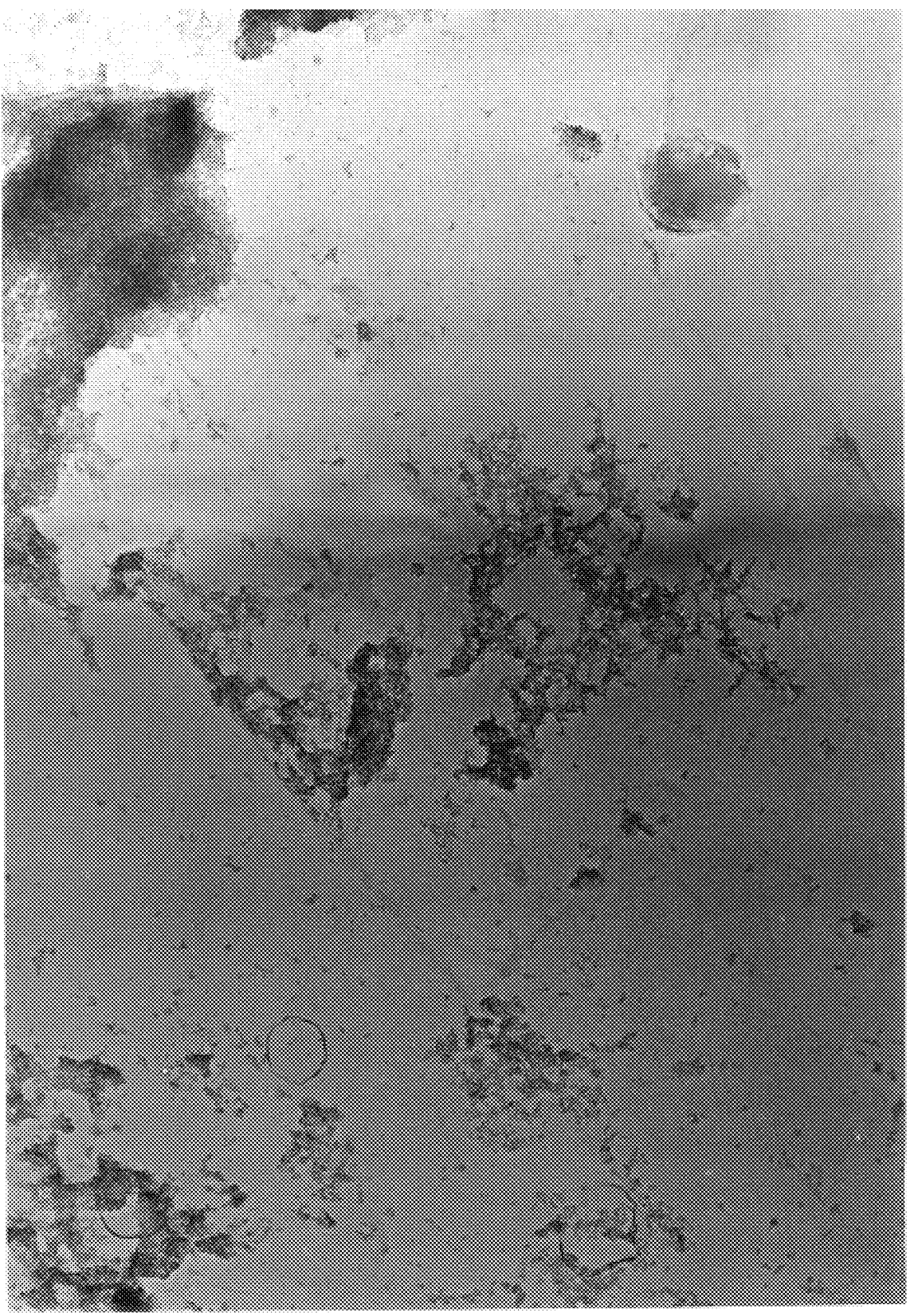
FIG. 6 shows a micrograph of the particles from Example 6.

A solution of 0.39 g (1.5 mmoles) of tin (IV) chloride in 250 ml of osmosed water is introduced into a glass reactor. While stirring, 0.32 g (1.5 mmoles) of tetraethoxysilane in a mixture of water and ethanol (20 ml/230) is added. A solution of 0.87 g (3.6 mmoles) of aluminum chloride hexahydrate in 1000 ml of osmosed water is added. The pH of the mixture is 3.65. The pH is adjusted to 5 with NaOH 1N, and then to 4.3 with a mixture of HCl 1N and acetic acid 2N. Heating, coagulation and purification then take place as in Example 1. A thixotropic gel is obtained which has an Al:Sn+Si ratio by weight of 0.31 as determined by ICP. FIG. 6 is a microscopic view of the structure of the gel.

The materials prepared in Examples 1 to 6 were analyzed by EDX spectrometry and by ICP emission spectrometry. The consistency of the values yielded by the EDX and ICP techniques is indicative of the homogeneity and purity of the phase corresponding to the aforementioned general formula.

The values obtained are shown in the following table:

TABLE

| Example | Al/x or Al/x + Si) ratios of starting products (by weight/molar) | Al/x or Al/(x + Si) by weight/molar | |
|---|---|---|---|
| | | EDX analysis | ICP analysis |
| 1 | 0.90/1.71 | 0.96/1.70 | 0.82/1.46 |
| 2 | 0.91/1.28 | 0.71/1.43 | 0.90/1.10 |
| 3 | 0.51/1.71 | 0.41/1.38 | 0.50/1.68 |
| 4 | 0.58/1.28 | 0.47/0.85 | 0.48/0.97 |
| 5 | 0.37/1.64 | 0.27/1.17 | 0.13/1.17 |
| 6 | 0.44/1.2 | 0.42/1.27 | 0.31/1.12 | x - element chosen therefore $M^1$

The closer the results of the EDX analysis are to the TEM and ICP, the purer the material obtained.

The invention has been described in detail with particular reference to certain preferred embodiments thereof, but it will be understood that variations and modifications can be effected within the spirit and scope of the invention.

We claim:

1. Inorganic polymer material which comprises a gel constituent that corresponds to the formula $Al_x M^1_{y1} Si_{y2} O_z$ in which x represents the Al stoichiometry of the compound and is in the range of from 0.8 to 3.0, $M^1$ is chosen from the group consisting of titanium, zirconium and tin;

y1 represents the stoichiometry of $M^1$;

y2 represents the stoichiometry of Si and can be equal to 0;

x, y1 and y2 are such that x/y1+y2 is in the range of from 0.8 to 3;

z is determined by the valency of $M^1$ so as to obtain neutrality of charges.

2. The inorganic polymer material according to claim 1, characterized in that the said constituent also contains an additional element chosen from the class consisting of metals of groups Vb and Va of the periodic table.

3. Photographic product comprising at least one layer which contains the inorganic polymer material according to claim 1.

4. Photographic product according to claim 3, characterized in that it contains at least one layer in which the said material is in admixture with a binder.

* * * * *